United States Patent
Naitoh

(10) Patent No.: US 10,055,177 B2
(45) Date of Patent: Aug. 21, 2018

(54) INFORMATION PROCESSING SYSTEM, INFORMATION PROCESSING APPARATUS, AND INFORMATION PROCESSING METHOD

(71) Applicant: Shohichi Naitoh, Kanagawa (JP)

(72) Inventor: Shohichi Naitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/456,716

(22) Filed: Mar. 13, 2017

(65) Prior Publication Data

US 2017/0269881 A1    Sep. 21, 2017

(30) Foreign Application Priority Data

Mar. 18, 2016   (JP) ................ 2016-056017

(51) Int. Cl.
  *G06F 3/12*   (2006.01)
  *G06K 15/02*  (2006.01)

(52) U.S. Cl.
  CPC .......... *G06F 3/1213* (2013.01); *G06F 3/1204* (2013.01); *G06F 3/126* (2013.01); *G06F 3/1244* (2013.01); *G06F 3/1253* (2013.01); *G06F 3/1275* (2013.01); *G06K 15/1823* (2013.01)

(58) Field of Classification Search
  CPC .... G06F 3/1213; G06F 3/1204; G06F 3/1244; G06F 3/1253; G06F 3/126; G06F 3/1275; G06K 15/1823
  USPC ....................................................... 358/1.15
  See application file for complete search history.

(56) References Cited

U.S. PATENT DOCUMENTS

| 6,950,203 | B1  |   | 9/2005  | Akabane et al. |               |
|-----------|-----|---|---------|----------------|---------------|
| 2008/0239379 | A1 | * | 10/2008 | Ito .................. | H04N 1/00209  |
|           |     |   |         |                | 358/1.15      |
| 2011/0051185 | A1 |   | 3/2011  | Takahashi      |               |
| 2012/0086974 | A1 | * | 4/2012  | Kiuchi ............... | G06K 15/1802 |
|           |     |   |         |                | 358/1.15      |
| 2012/0120439 | A1 | * | 5/2012  | Minagawa ............ | G06F 3/1208 |
|           |     |   |         |                | 358/1.15      |

(Continued)

FOREIGN PATENT DOCUMENTS

| EP | 1394670 A2   | 3/2004 |
| JP | 2011-048766  | 3/2011 |
| JP | 2015-087985  | 5/2015 |

OTHER PUBLICATIONS

Extended European Search Report dated Aug. 24, 2017.

*Primary Examiner* — Allen H Nguyen
(74) *Attorney, Agent, or Firm* — Harness, Dickey & Pierce, P.L.C.

(57) ABSTRACT

An information processing system includes processing circuitry. The processing circuitry is configured to analyze a print job taken out of a printer queue storing the print job for ordering an execution of printing; transmit the print job to an output device when an analysis of the print job indicates that the print job is a re-input job that is input to the printer queue again after being taken out of the printer queue; execute a predetermined processing when the analysis indicates that the print job is not the re-input job; embed re-input information indicating that the print job is the re-input job into the print job after the predetermined processing is executed; and return the print job having been edited to the printer queue.

16 Claims, 9 Drawing Sheets

(56) References Cited

U.S. PATENT DOCUMENTS

2012/0287446 A1* 11/2012 Matsumura .......... G06K 15/005
 358/1.6
2013/0286425 A1* 10/2013 Nakamura ............ G06F 3/1204
 358/1.13
2016/0253128 A1 9/2016 Mori

* cited by examiner

| JOB ID | PRINTER ICON NAME | FILE PATH |
|---|---|---|
| 1 | Printer_A | C:/xxx/xxx/xxx/1a.prn |
| 2 | Printer_B | C:/xxx/xxx/xxx/2b.prn |
| 3 | Printer_C | C:/xxx/xxx/xxx/3c.prn |
| ⋮ | ⋮ | ⋮ |

FIG.9

| JOB ID | PRINTER ICON NAME | IP ADDRESS OF CLIENT TERMINAL | FILE PATH |
|---|---|---|---|
| 1 | Printer_A | xxx/xxx/xxx/111 | C:/xxx/xxx/xxx/1a.prn |
| 2 | Printer_B | xxx/xxx/xxx/112 | C:/xxx/xxx/xxx/2b.prn |
| 3 | Printer_C | xxx/xxx/xxx/113 | C:/xxx/xxx/xxx/3c.prn |
| ... | ... | ... | ... |

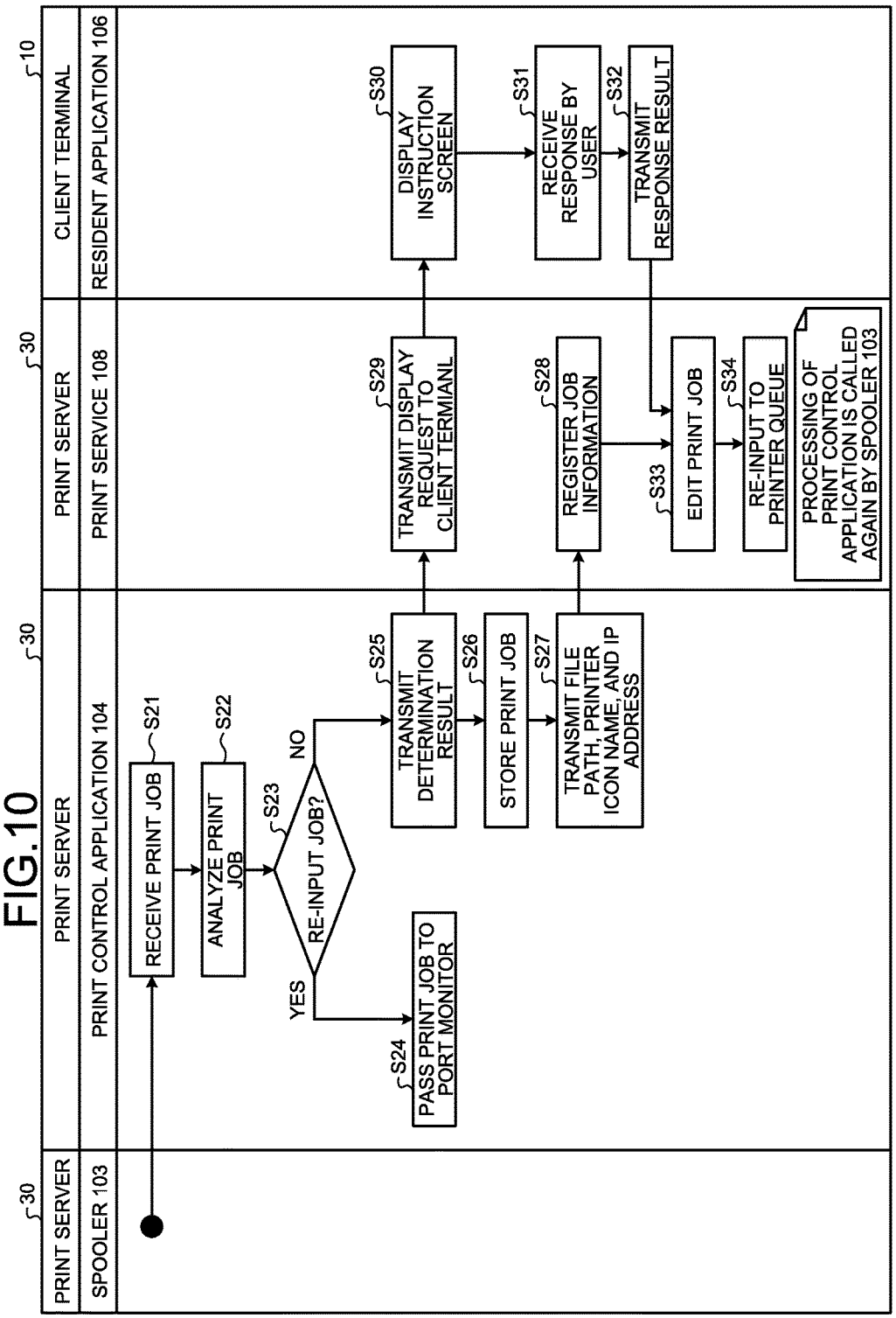

INFORMATION PROCESSING SYSTEM, INFORMATION PROCESSING APPARATUS, AND INFORMATION PROCESSING METHOD

CROSS-REFERENCE TO RELATED APPLICATIONS

The present application claims priority under 35 U.S.C. § 119 to Japanese Patent Application No. 2016-056017, filed on Mar. 18, 2016. The contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In Microsoft Windows®, image data generated by an application is rendered into a format in which the image data can be printed by a printer driver, and stuck in the printer queue of a print spooler in response to a request for printing from a user, for example. The print spooler takes a print job out of the printer queue and passes it to a port monitor. The port monitor, when receiving the print job, then transmits the print job to a printer set as an output destination. The printer as an output destination executes printing based on the print job. For example, Japanese Unexamined Patent Application Publication No. 2011-048766 discloses a configuration of switching output destinations of a print job by changing a print port for each print job.

Here, since a port monitor is scalable, it is possible by setting one's own port monitor to enable an execution of a processing except for a normal printing. Here, considered is an idea of realizing, by a port monitor, a processing of displaying an instruction screen before an execution of printing, executing the printing when receiving an instruction for executing (continuing) the printing from a user, and cancelling the printing when receiving an instruction for cancellation. Since the port monitor operates by a system process, it is generally impossible to display a UI in a session of a user. Therefore, a technique of preparing a resident application which operates in the session of the user and displaying a UI through the intervention of the resident application has been known.

However, there is a problem that the processing efficiency deteriorates when a UI requiring a reception of a response (instruction) by a user is displayed, since it is conventionally impossible to carry forward a next job until receiving the response by the user.

SUMMARY OF THE INVENTION

According to one aspect of the present invention, an information processing system includes processing circuitry. The processing circuitry is configured to analyze a print job taken out of a printer queue storing the print job for ordering an execution of printing; transmit the print job to an output device when an analysis of the print job indicates that the print job is a re-input job that is input to the printer queue again after being taken out of the printer queue; execute a predetermined processing when the analysis indicates that the print job is not the re-input job; embed re-input information indicating that the print job is the re-input job into the print job after the predetermined processing is executed; and return the print job having been edited to the printer queue.

BRIEF DESCRIPTION OF THE DRAWINGS

FIG. 9 illustrates an example of job information according to the second embodiment; and FIG. 10 illustrates a flow of a processing of a print job according to the second embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
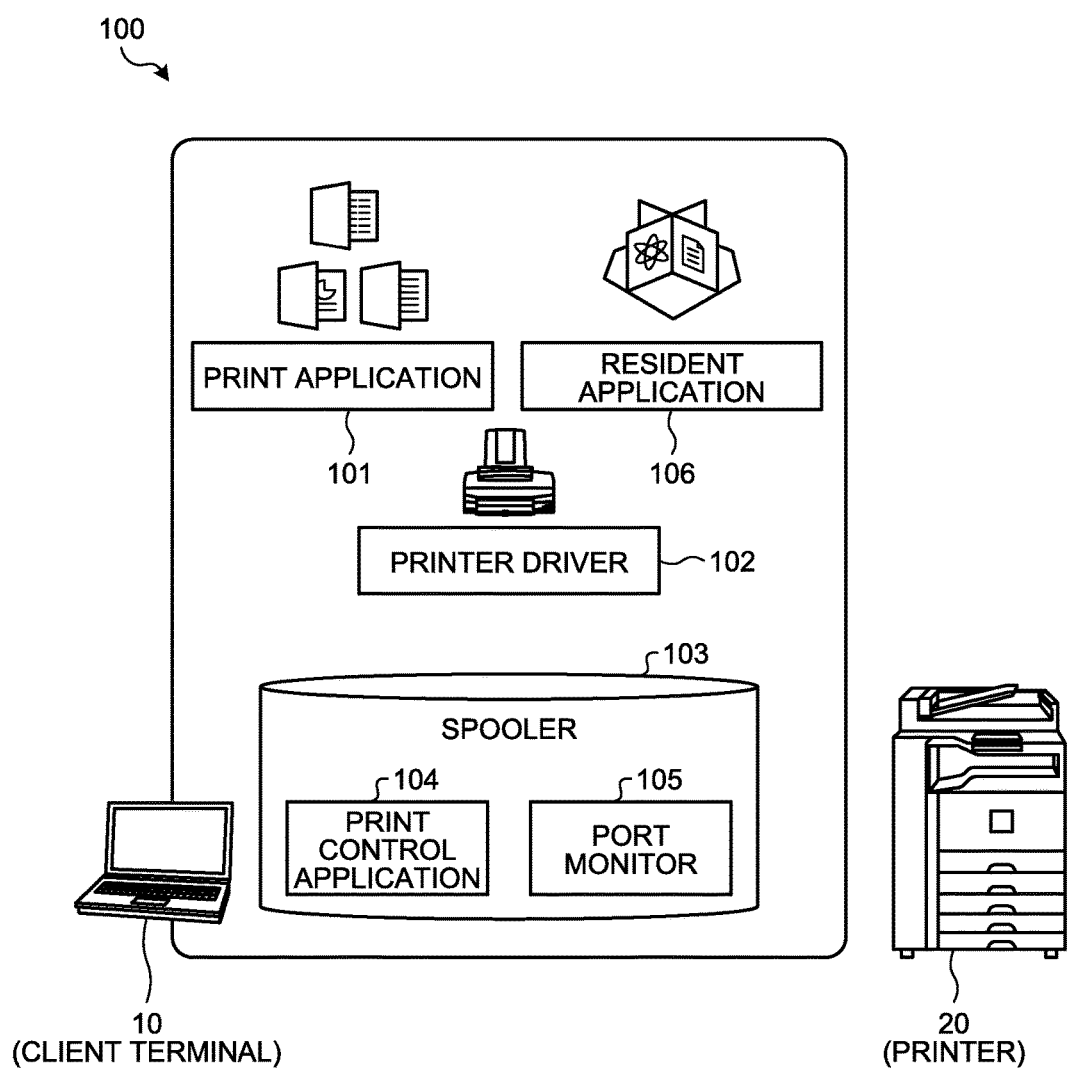
FIG. 1 illustrates an example of a configuration of an information processing system according to the first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a system capable of making, when a plurality of jobs are input, the jobs processed in the input order and controlling the jobs to be processed efficiently.

While a printer which is one mode of an image forming apparatus will be taken as an example of an output device and explained in the example below, the present invention is not limited thereto and a kind of the output device may be determined arbitrarily. For example, a projector and the like may be used as the output device.

First Embodiment

FIG. 1 illustrates an example of a configuration of an information processing system 100 according to a first embodiment. As illustrated in FIG. 1, the information processing system 100 is a print system provided with a client terminal 10 and at least one printer 20, the client terminal 10 and the printer 20 being connected with wire or wirelessly.

For example, the information processing system 100 may be configured to be connected via a network such as the Internet. In the information processing system 100, the client terminal 10 generates a print job that orders an execution of printing depending on an operation by a user and transmits the generated print job to any of the printer 20 set as an output destination. The printer 20 having received the print job executes the printing based on the received print job.

The client terminal 10 is an information processing apparatus such as a PC (Personal Computer) used by a user. The client terminal 10 is not limited to a stationary form and may be a portable form (for example, a smartphone form and a tablet form), for example.

In the example in FIG. 1, programs that operate on an operating system (OS) of the client terminal 10 include, for example, a print application 101, such as that included in Microsoft Word® or Microsoft Excel®, which generates a print job in accordance with a user operation; a printer driver 102 that converts the print job generated by the print application 101 into a printable format by the printer 20; a spooler (Print Spooler) 103 that temporarily stores print jobs converted by the printer driver 102 and sequentially executes the print jobs; a print control application 104 that performs a unique extension processing; a port monitor 105; and a resident application 106 that operates in a user session. In this example, the print control application 104 and the port monitor 105 are loaded as a process of the spooler 103 operating in a system process. Here, the print job includes information that specifies the printer 20 as an output destination, print conditions, user information, data of a print target (graphic data), and the like.

Figure 2:
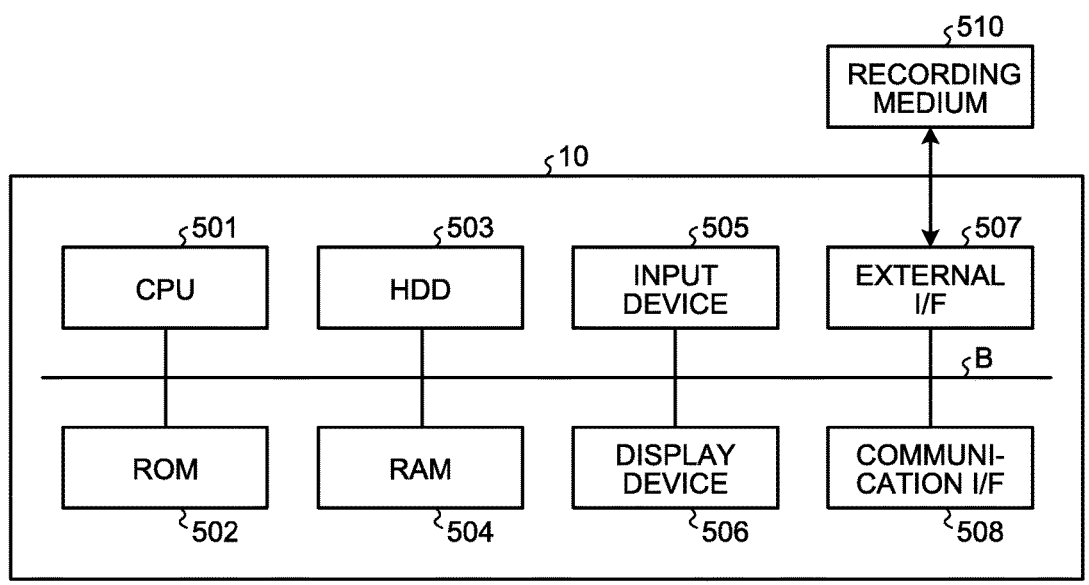
FIG. 2 illustrates an example of a hardware configuration of a client terminal.

FIG. 2 illustrates an example of a hardware configuration of the client terminal 10. As illustrated in FIG. 2, the client terminal 10 is provided with a CPU 501, a ROM 502, an HDD 503, a RAM 504, an input device 505, a display device 506, an external I/F 507, and a communication I/F 508, which are connected to each together via a bus B.

The CPU 501 is an arithmetic device that reads out programs and data from a storage device such as the ROM 502 and the HDD 503 onto the RAM 504 and executes a processing to control the entirety of the client terminal 10 and realize various kinds of functions thereof.

The ROM 502 is an example of a non-volatile semiconductor memory (storage device) capable of storing programs and data even when the power is turned off (even when a power supply to the client terminal 10 is shut off). In the ROM 502, programs and data of the BIOS to be executed in a start-up of the client terminal 10, OS settings, network settings, and the like are stored.

The HDD 503 is an example of a non-volatile storage device that stores programs and data. In the HDD 503, an OS which is a basic software controlling the entirety of the client terminal 10, application software (hereinafter simply referred to as "application") that provides various kinds of functions on the OS, and the like are stored. Here, the client terminal 10 may use, instead of the HDD 503, a drive device (SSD: Solid State Drive, for example) using a flash memory as a storage medium.

The RAM 504, which is an example of a volatile storage device that temporarily stores programs and data, functions as a work space (work area) of a processing to be executed by the CPU 501.

The input device 505, which is a device used by a user for inputting various kinds of operation signals, can be configured by a keyset, mouse, a touch-sensitive panel, and the like, for example. The display device 506, which is a device that displays information of various kinds (a result of a processing by the client terminal 10 and the like, for example), can be configured by a display device of a liquid crystal type, for example. Here, a form in which the input device 505 and the display device 506 are integrally configured like a touch sensitive panel may be adopted, for example. Besides, a form in which the input device 505 and the display device 506 are connected and used when needed may be adopted.

The external I/F 507 is an interface with an external device. While a recording medium 510 is taken as an example of the external device in the example in FIG. 2, the present invention is not limited thereto. The client terminal 10 is capable of reading data from the recording medium 510 and writing data to the recording medium 510 via the external I/F 507. A flexible disk, a CD, a DVD, an SD memory card, and a USB memory can be taken as an example of the recording medium 510.

The communication I/F 508 is an interface that allows communicating with the printer 20. For example, in a form of a communication via a network such as the Internet between the client terminal 10 and the printer 20, the communication I/F 508 is an interface that allows a connection of the client terminal 10 to the network.

Figure 3:
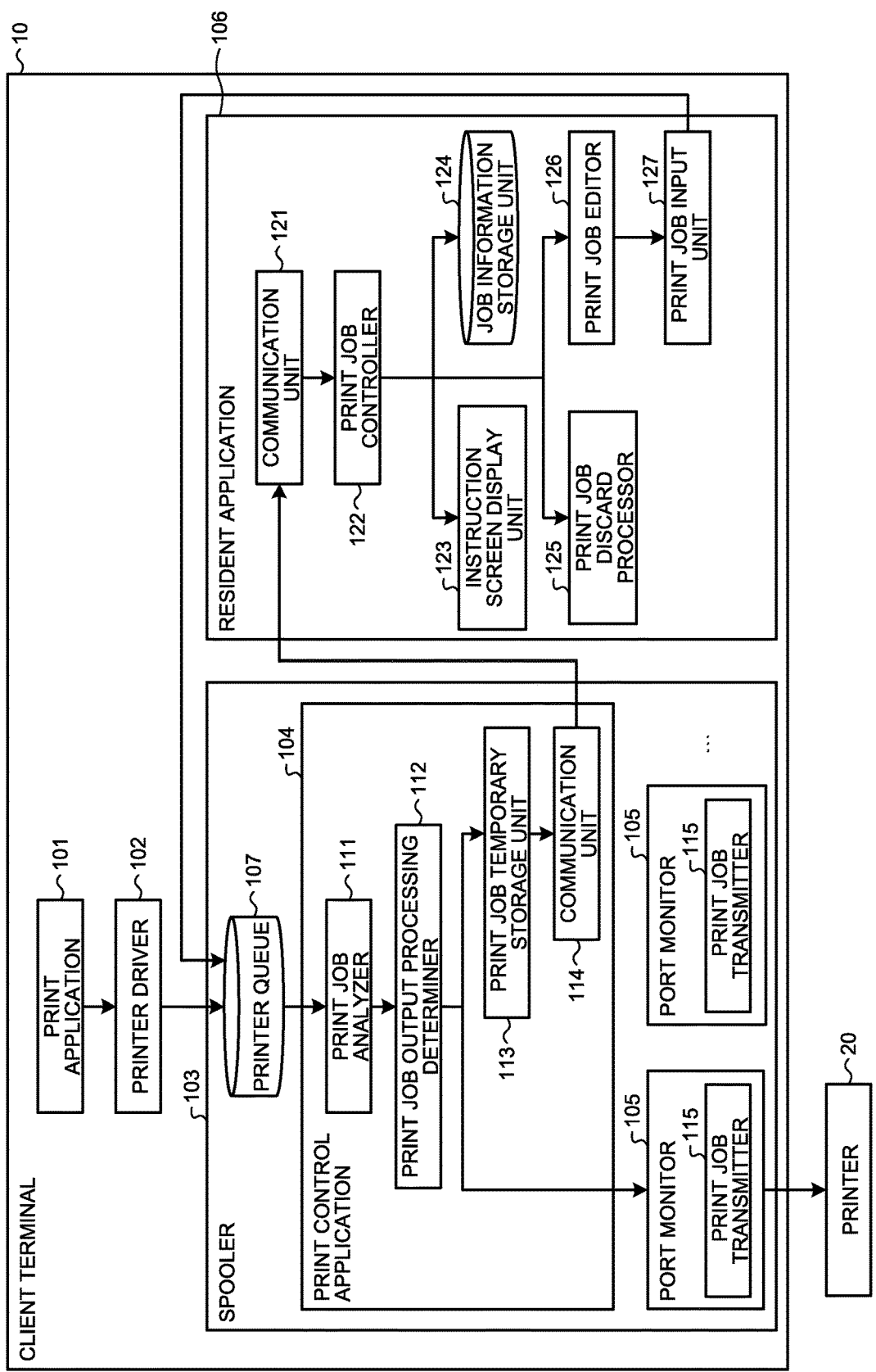
FIG. 3 illustrates an example of functions included in the client terminal.

FIG. 3 illustrates an example of functions included in the client terminal 10. The client terminal 10 includes functions to be provided by the print application 101, the printer driver 102, the spooler 103, and the resident application 106.

As illustrated in FIG. 3, the spooler 103 includes a printer queue 107, the print control application 104, and a plurality of port monitors 105. The printer queue 107 stores print jobs. In this example, the printer queue 107 is a buffer of a first-in first-out (FIFO) method and sequentially stores print jobs provided by the printer driver 102. The port monitor 105 is provided for each printer icon (for each print setting). While a print job taken out of the printer queue 107 by the spooler 103 is normally passed to a corresponding port monitor 105, the print control application 104 obtains (deprives) the print job taken out of the printer queue 107 before the print job is passed to the port monitor 105, and executes a processing to be explained later in this example. A specific content will be explained below.

As illustrated in FIG. 3, the print control application 104 includes a print job analyzer 111, a print job output processing determiner 112, a print job temporary storage unit 113, and a communication unit 114.

The print job analyzer 111 analyzes a print job which is taken out of the printer queue 107. More specifically, the print job analyzer 111 analyzes, whenever a print job is taken out of the printer queue 107 by the spooler 103, the print job taken out of the printer queue 107 and determines whether or not the print job is a re-input job, which is input (returned) again to the printer queue 107 after being taken out of the printer queue 107.

The print job output processing determiner 112 determines an output processing depending on a result of the analysis by the print job analyzer 111. Here, when it is determined by the print job analyzer 111 that the print job taken out of the printer queue 107 is a re-input job, the print job output processing determiner 112 passes the print job to the port monitor 105 dealing with the setting of the print job. For example, the print job output processing determiner 112 is able to grasp the setting for printing based on the result of the analysis by the print job analyzer 111 and to specify the port monitor 105 dealing with the setting for the printing.

Each port monitor 105 includes a print job transmitter 115 that transmits the print job passed from the print control application 104 (print job output processing determiner 112)

to the printer 20. In essence, when it is determined by the print job analyzer 111 that the print job taken out of the printer queue 107 is a re-input job, the print job transmitter 115 includes a function of transmitting the print job to the printer 20 (an example of the output device).

On the other hand, when it is determined by the print job analyzer 111 that the print job taken out of the printer queue 107 is not a re-input job, the print job output processing determiner 112 stores the print job in the print job temporary storage unit 113 and instructs the communication unit 114 to transmit the result of the determination to the resident application 106. The communication unit 114, when receiving this instruction, transmits the determination result to the resident application 106. After the storage of the print job in the print job temporary storage unit 113 is completed, the print job output processing determiner 112 instructs the communication unit 114 to transmit, to the resident application 106, information indicating a storage location of the print job (a file path in this example) and information indicating the printer 20 as an output destination (a printer icon name in this example) in the print job temporary storage unit 113. The communication unit 114, when receiving this instruction, transmits the file path and the printer icon name to the resident application 106.

As illustrated in FIG. 3, the resident application 106 includes a communication unit 121, a print job controller 122, an instruction screen display unit 123, a job information storage unit 124, a print job discard processor 125, a print job editor 126, and a print job input unit 127.

The communication unit 121 communicates with the print control application 104. When receiving the determination result, the communication unit 121 passes the received determination result to the print job controller 122. The print job controller 122 instructs the instruction screen display unit 123 to display an instruction screen via which whether or not to execute the printing based on the print job is instructed. The instruction screen display unit 123, when receiving this instruction, performs a control of displaying the instruction screen illustrated in FIG. 4 in the display device 506. Here, the instruction screen display unit 123 is an example of a "processor" and it is possible to consider that the instruction screen display unit 123 includes a function of executing a predetermined processing when it is determined by the print job analyzer 111 that the print job taken out of the printer queue 107 is not a re-input job. More specifically, as the predetermined processing, the instruction screen display unit 123 displays the instruction screen via which whether or not to execute the printing based on the print job is instructed and performs a processing of receiving an instruction by a user.

Figures 4, 5:
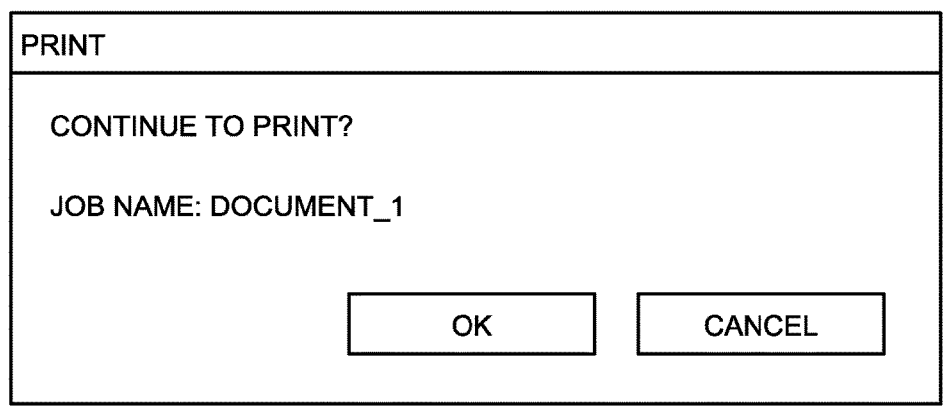
FIG. 4 illustrates an example of an instruction screen.
FIG. 5 illustrates an example of job information.

Besides, when receiving the file path and the printer icon name, the communication unit 121 passes the received file path and printer icon name to the print job controller 122. The print job controller 122 stores, in the job information storage unit 124, job information in which a job ID that identifies the print job, and the file path and the printer icon name which are received from the print control application 104 via the communication unit 121 are associated. FIG. 5 illustrates an example of job information. After the display of the instruction screen is finished, the corresponding record may be deleted.

When receiving an instruction for executing printing (receiving a depression of the "OK" button illustrated in FIG. 4) via the instruction screen, the instruction screen display unit 123 notifies the print job controller 122 of the effect. The print job controller 122 having received this notification uses the file path received from the print control application 104 to obtain the print job stored in the print job temporary storage unit 113. The print job controller 122 then instructs the print job editor 126 to embed, into the obtained print job, re-input information indicating that the print job is a re-input job. The print job editor 126, when receiving this instruction, performs an editing processing of embedding the re-input information into the print job. For example, when property information included in the print job is written in a PJL (Printer Job Language), it is possible to add a parameter indicating the re-input information. In other words, the re-input information may be expressed in the PJL. Since it is impossible to add a new parameter when the property information included in the print job as set in a standard format of, for example, Microsoft Windows®, the fact that the print job is a re-input job may be identified by changing a predetermined parameter value. Either configuration is included in the concept of "embedding re-input information into the print job". In essence, the print job editor 126 includes a function of embedding, into the print job, the re-input information indicating that the print job is a re-input job after a predetermined processing by the instruction screen display unit 123 (a processing of displaying the instruction screen and receiving an instruction by a user in this example) is executed.

The print job editor 126 then passes the print jot after edition to the print job input unit 127. The print job input unit 127 returns (re-inputs), to the printer queue 107, the print job edited by the print job editor 126.

On the other hand, when receiving an instruction for cancelling printing (receiving a depression of the "CANCEL" button illustrated in FIG. 4) via the instruction screen, the instruction screen display unit 123 notifies the print job controller 122 of the effect. The print job controller 122, when receiving this notification, instructs the print job discard processor 125 to discard the print job stored in a storage location specified by the file path received from the print control application 104 in the print job temporary storage unit 113. The print job discard processor 125, when receiving this instruction, performs a processing of discarding the print job.

The functions included in the client terminal 10 explained above are realized when the CPU 501 executes programs stored in a storage device such as the ROM 502 and the HDD 503.

Figure 6:
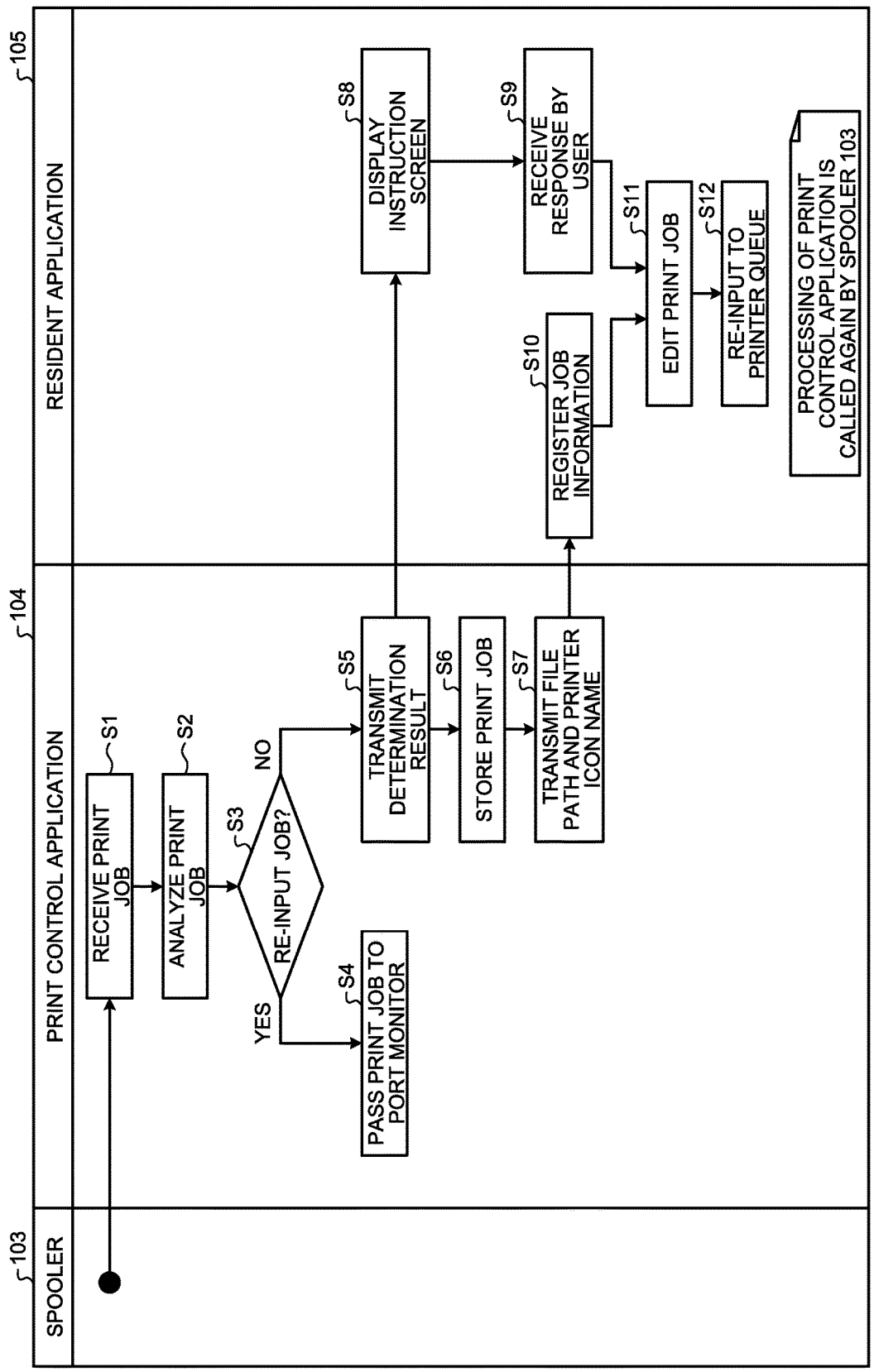
FIG. 6 illustrates a flow of a processing of a print job according to the first embodiment.

FIG. 6 illustrates a flow of the processing of a print job explained above. As illustrated in FIG. 6, the print control application 104 first receives a print job (a print job taken out of the printer queue 107) from the spooler 103 (step S1). Next, the print control application 104 analyzes the received print job (step S2) and determines whether or not the print job is a re-input job (step S3). When a result at step S3 is affirmative ("Yes" at step S3), the print control application 104 passes the print job received at step S1 to a corresponding port monitor 105 (step S4). When the result at step S3 is negative ("No" at step S3), the print control application 104 transmits the determination result to the resident application 106 (step S5). The print control application 104 stores the print job received at step S1 in the print job temporary storage unit 113 (step S6). After the completion of the storage, the print control application 104 transmits, to the resident application 106, the file path indicating the storage location of the print job received at step S1 and the printer icon name indicating the printer 20 as an output destination in the print job temporary storage unit 113 (step S7).

When receiving the determination result from the port monitor 105, the resident application 106 performs a control of displaying the instruction screen (step S8) and receives a response by the user (step S9). Besides, when receiving the file path and the printer icon name from the port monitor 105, the resident application 106 registers the job information (step S10).

Here, a situation where an instruction for executing printing is received via the instruction screen at step S9 is assumed. In this case, the resident application 106 uses the file path included in the job information registered at step S10 to obtain the print job stored in the print job temporary storage unit 113 and perform the editing processing of embedding the re-input information into the obtained print job (step S11). The resident application 106 then re-inputs the print job after edition to the printer queue 107 (step S12). The re-input print job is taken out of the printer queue 107 again and the processing from step S1 is to be repeated.

As explained so far, the re-input information indicating that the print job is a re-input job is embedded into the print job to which a predetermined processing (processing of displaying the instruction screen and receiving an instruction by the user in the example above) is performed before the output to the printer 20 and the print job with the embedment is re-input to the printer queue 107 in the first embodiment. Therefore, the print control application 104 is able to determine whether or not the print job is a re-input job by analyzing the print job taken out of the printer queue 107 and to directly pass the print job to a corresponding port monitor 105 and cause the print job to be output from the printer 20 without the execution of the predetermined processing when the print job is a re-input job. It is thereby possible to improve the processing efficiency.

Second Embodiment

A second embodiment will be explained next. An explanation about a common part to the first embodiment will be omitted accordingly.

Figure 7:
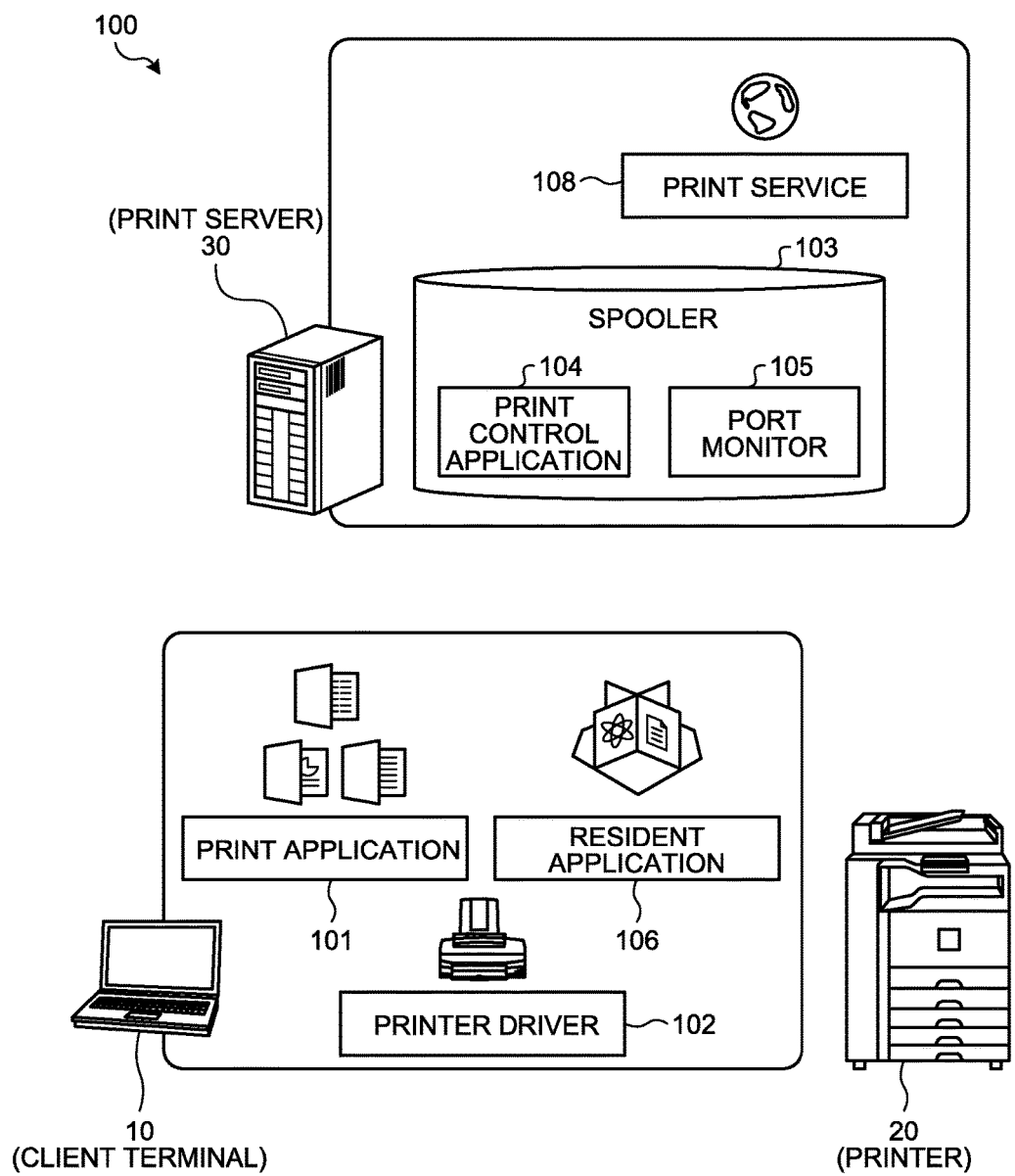
FIG. 7 illustrates an example of a configuration of an information processing system according to the second embodiment.

FIG. 7 illustrates an example of a configuration of an information processing system 100 according to the second embodiment. As illustrated in FIG. 7, the information processing system 100 is provided with a print server 30 in addition to the client terminal 10 and the printer 20. The print server 30 is connected to the client terminal 10 with wire or wirelessly. For example, the connection may be configured to be made via a network such as the Internet. For the convenience of explanation, the hardware configuration of the print server 30 is assumed to be the same as the configuration in FIG. 2 (the same as the client terminal 10).

In the second embodiment, the spooler 103 is loaded onto the print server 30. Functions (the print job editor 126, the print job input unit 127, and the like) other than the instruction screen display unit 123 in the functions of the resident application 106 explained in the first embodiment are implemented onto the print server 30 as a print service 108.

In the second embodiment, the client terminal 10 includes the print application 101, the printer driver 102, and the resident application 106. The function of the resident application 106 is mainly to display an instruction screen and does not include the function of editing a print job (the print job editor 126), the function of returning the print job after edition to the printer queue 107 (the print job input unit 127), and the like. In other words, the functions, other than the function of displaying the instruction screen for a user, in the functions of the spooler 103 and the resident application 106 explained in the first embodiment are transferred to the print server 30 in the second embodiment. More specific content will be explained later.

Figure 8:
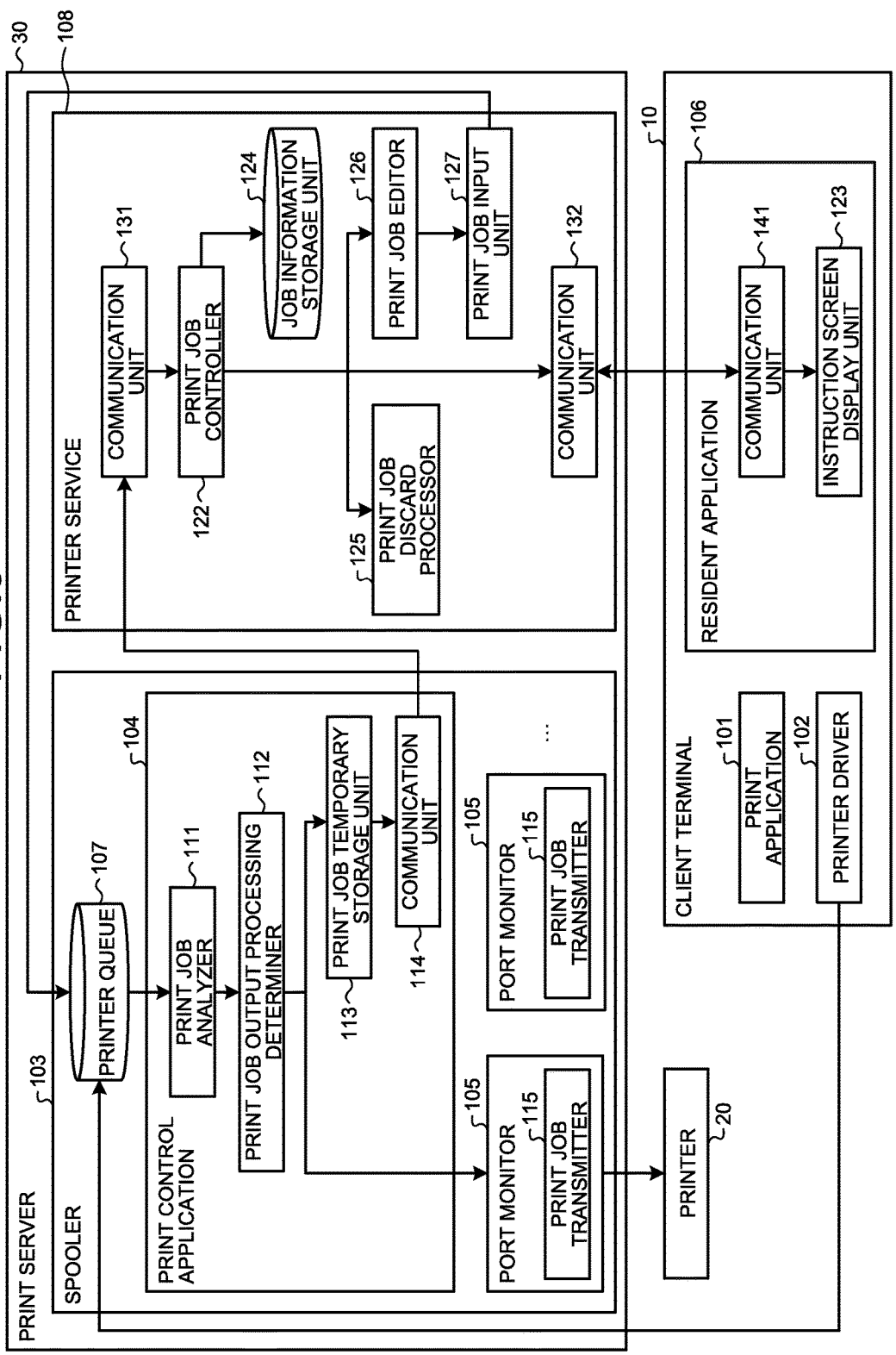
FIG. 8 illustrates an example of functions included in a print server and a client terminal according to the second embodiment.

FIG. 8 illustrates an example of functions included in the client terminal 10 and the print server 30. As illustrated in FIG. 8, the print server 30 includes the spooler 103 and the print service 108. The spooler 103 includes the printer queue 107, the print control application 104, and a plurality of port monitors 105. The functions of those units are the same as the first embodiment.

A communication unit 116 included in the print control application 104 is of a function of communicating with the print service 108. Similarly to the first embodiment, when it is determined by the print job analyzer 111 that the print job taken out of the printer queue 107 is not a re-input job, the print job output processing determiner 112 included in the print control application 104 stores the print job in the print job temporary storage unit 113 and instructs the communication unit 116 to transmit the determination result to the print service 108. The communication unit 116 having received this instruction transmits the determination result to the print service 108. After the storage of the print job in the print job temporary storage unit 113 is completed, the print job output processing determiner 112 instructs the communication unit 116 to transmit, to the print service 108, the file path indicating the storage location of the print job, the printer icon name indicating the printer 20 as an output destination, and an IP address (obtained by the analysis by the print job analyzer 111) of the client terminal 10 having requested the printing in the print job temporary storage unit 113. The communication unit 116 having received this instruction transmits the file path, the printer icon name, and the IP address to the print service 108.

The print service 108 includes a communication unit 131, the print job controller 122, the job information storage unit 124, the print job discard processor 125, the print job editor 126, the print job input unit 127, and a communication unit 132.

The communication unit 131 communicates with the print control application 104 and the communication unit 132 communicates with the client terminal 10. When receiving, from the port monitor 105, the determination result (the determination result to the effect that the print job is not a re-input job) by the print job output processing determiner 112, the communication unit 131 passes the received determination result to the print job controller 122. The print job controller 122, when receiving the determination result, instructs the communication unit 132 to transmit a request for displaying the instruction screen to the resident application 106 of the client terminal 10. The communication unit 132, when receiving this instruction, transmits the display request to the resident application 106.

When receiving the file path, the printer icon name, and the IP address, the communication unit 131 passes the received file path, printer icon name, and IP address to the print job controller 122. The print job controller 122 stores, in the job information storage unit 124, job information in which a job ID and the received file path, printer icon name, and IP address are associated. FIG. 9 illustrates an example of job information. After the display of the instruction screen is finished, a corresponding record may be deleted.

In the example in FIG. 8, the resident application 106 included in the client terminal 10 includes a communication unit 141 and the instruction screen display unit 123. The communication unit 141 communicates with the print service 108. When receiving the display request from the print service 108, the communication unit 141 passes the received display request to the instruction screen display unit 123. The instruction screen display unit 123 then performs a control of displaying the instruction screen in the display device 506. When receiving an instruction for executing printing (receiving a depression of the "OK" button illustrated in FIG. 4) via the instruction screen, the instruction screen display unit 123 transmits a response result indicating that the instruction for executing printing is received to the print service 108 via the communication unit 141. When receiving an instruction for cancelling printing (receiving a depression of the "CANCEL" button illustrated in FIG. 4) via the instruction screen, the instruction screen display unit 123 transmits a response result that the instruction for cancelling printing is received to the print service 108 via the communication unit 141.

When receiving the response result from the resident application 106 of the client terminal 10, the communication unit 132 of the print service 108 passes the received response result to the print job controller 122. When the response result indicates that the instruction for executing printing is received, the print job controller 122 uses the file path received from the print control application 104 to obtain the print job stored in the print job temporary storage unit 113. The print job controller 122 then instructs the print job editor 126 to embed, into the obtained print job, re-input information indicating that the print job is a re-input job. Similarly to the first embodiment, the print job editor 126, when receiving this instruction, performs the editing processing of embedding the re-input information into the print job and the print job input unit 127 returns (re-inputs), to the printer queue 107, the print job edited by the print job editor 126.

On the other hand, when the response result indicates that the instruction for cancelling the printing is received, the print job controller 122 instructs the print job discard processor 125 to discard the print job stored at the storage location specified by the file path received from the print control application 104 in the print job temporary storage unit 113. The print job discard processor 125, when receiving this instruction, performs the processing of discarding the print job. The other configuration is the same as the first embodiment.

The functions of the client terminal 10 and the print server 30 explained above are realized when the CPU 501 executes programs stored in the storage device such as the ROM 502 and the HDD 503.

FIG. 10 illustrates a flow of the processing of the print job explained above. The processing content at steps S21 to S26 is the same as the processing content at steps S1 to S6 illustrated in FIG. 6 and therefore the detailed explanation thereof will be omitted. After the storage is completed at step S26, the print control application 104 transmits, to the print service 108, the file path indicating the storage location of the print job received at step S21, the printer icon name indicating the printer 20 as an output destination, and the IP address of the client terminal 10 having requested the printing in the print job temporary storage unit 113 (step S27). When receiving the file path, the printer icon name, and the IP address from the print control application 104, the print service 108 registers the job information (step S28).

When receiving the determination result transmitted from the print control application 104 at step S25, the print service 108 transmits the display request to the resident application 106 (step S29). The resident application 106, when receiving the display request from the print service 108, performs the control of displaying the instruction screen (step S30) and receives a response by the user (step S31). Here, a situation where the instruction for executing printing is received via the instruction screen at step S30 is assumed. In this case, the resident application 106 transmits a response result indicating that the instruction for executing the printing is received to the print service 108 (step S32).

The print service 108 having received the response result uses the file path included in the job information registered at step S28 to obtain the print job stored in the print job temporary storage unit 113 and perform the editing processing of embedding the re-input information into the obtained print job (step S33). The print service 108 then re-inputs the print job after edition to the printer queue 107 (step S34). The re-input print job is taken out of the printer queue 107 again and the processing from step S21 is to be repeated.

The re-input information indicating that the print job is a re-input job is embedded into the print job to which a predetermined processing (processing of displaying the instruction screen and receiving an instruction by the user in the example above) is performed before the output to the printer 20 and the print job with the embedment is re-input to the printer queue 107 in the above-explained second embodiment, too. Therefore, the print control application 104 is able to determine whether or not the print job is a re-input job by analyzing the print job taken out of the printer queue 107 and to directly pass the print job to a corresponding port monitor 105 and cause the print job to be output from the printer 20 without the execution of the predetermined processing when the print job is a re-input job. It is thereby possible to improve the processing efficiency.

Programs to be executed in the information processing system 100 (the programs to be executed by the CPU 501) may be provided by being recorded in a file of an installable format or of an executable format in a computer-readable recording medium such as a CD-ROM, a flexible disk (FD), a CD-R, a DVD (Digital Versatile Disk), and a USB (Universal Serial Bus), or may be provided or distributed via a network such as the Internet. Moreover, various kinds of programs may be provided by being preloaded onto the ROM and the like.

According to an embodiment, it is possible to improve the processing efficiency can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
   an information processing apparatus; and
   a server connected to the information processing apparatus via a network,
   the information processing apparatus comprising processing circuitry configured to
      receive an analysis of a print job from the server;
      display an instruction screen on a display, requesting an instruction to print the print job from a user; and
      transmit the instruction, in response to the instruction being received, to the server,
   the server comprising processing circuitry configured to:
      analyze the print job, taken out of a printer queue storing the print job, to provide the analysis of the print job indicating whether or not the print job is a re-input job, input to the printer queue a second time, the print job being directly passable for printing, upon the analysis indicating that the print job is a re-input print job, after being taken out of the printer queue;
      transmit the analysis of the print job for receipt by the information processing apparatus, and prior to the display of the instruction screen, in response to the analysis indicating that the print job is not a re-input job;
      receive the transmitted instruction from the information processing apparatus;
      transmit the print job to an output device in response to the analysis of the print job indicating that the print job is the re-input job;
      embed re-input information into the print job, to indicate the print job as a re-input job, after receiving the instruction to print from the information processing apparatus; and
      return the print job, after the re-input information is embedded, to the printer queue, the print job including the embedded re-input information being directly passable for printing once taken out of the printer queue.

2. The information processing system according to claim 1, wherein the re-input information is expressed by Printer Job Language.

3. The information processing system according to claim 2, wherein the server comprising processing circuitry is configured to embed the re-input information by adding a parameter indicative of the re-input information.

4. The information processing system according to claim 2, wherein the server comprising processing circuitry is configured to embed the re-input information by expressing the re-input information in the PJL.

5. The information processing system according to claim 3, wherein the print job is identifiable as the re-input job based upon a change of a value of the parameter.

6. The information processing system according to claim 1, wherein the server comprising processing circuitry is further configured to:
   store the print job in a print job temporary storage, prior to transmitting the analysis of the print job to the information processing apparatus, in response to the analysis indicating that the print job is not the re-input job.

7. The information processing system according to claim 6, wherein the server comprising processing circuitry is further configured to transmit the analysis of the print job to the information processing apparatus by transmitting a file path indicating a storage location of the print job.

8. The information processing system according to claim 7, wherein subsequent to transmission of the analysis of the print job to the information processing apparatus, indicating that the print job is not the re-input job, the print job is not output to a printer until a response to a displayed instruction is received.

9. The information processing system according to claim 1, wherein the information processing apparatus comprising processing circuitry is further configured to display a second instruction screen on the display, requesting an instruction from the user to cancel the print job, and is further configured to transmit the second instruction to the server, in response the second instruction being received, to the server.

10. The information processing system according to claim 1, wherein the re-input job is directly passable for printing without executing further processing on the re-input job prior to printing.

11. An information processing apparatus comprising processing circuitry configured to:
   analyze a print job, taken out of a printer queue storing the print job, to provide the analysis of the print job indicating whether or not the print job is a re-input job, input to the printer queue a second time, the re-input job being directly passable for printing, upon the analysis indicating that the print job is a re-input print job, after being taken out of the printer queue;
   display an instruction screen on a display, requesting an instruction to print the print job from a user in response to the analysis indicating that the print job is not the re-input job;
   transmit the print job to an output device in response to the analysis of the print job indicating that the print job is the re-input job;
   embed re-input information into the print job, to indicate the print job as a re-input job, after receiving the instruction to print from the information processing apparatus; and
   return the print job, after the re-input information is embedded, to the printer queue, the print job including the embedded re-input information being directly passable for printing once taken out of the printer queue.

12. The information processing apparatus according to claim 11, wherein the re-input information is expressed by Printer Job Language.

13. The information processing apparatus according to claim 11, wherein the re-input job is directly passable for printing, without executing further processing on the re-input job prior to printing.

14. An information processing method comprising: analyzing a print job, taken out of a printer queue storing the print job, to provide the analysis of the print job indicating whether or not the print job is a re-input job, input to the printer queue a second time, the re-input job being directly passable for printing, upon the analysis indicating that the print job is a re-input print job, after being taken out of the printer queue;

displaying an instruction screen on a display, requesting an instruction to print the print job from a user in response to the analysis indicating that the print job is not the re-input job;

transmitting the print job to an output device in response to the analysis of the print job indicating that the print job is the re-input job;

embedding re-input information into the print job, to indicate the print job as a re-input job, after receiving the instruction to print from the information processing apparatus; and returning the print job, after the re-input information is embedded, to the printer queue, the print job including the embedded re-input information being directly passable for printing once taken out of the printer queue.

15. The information processing method according to claim 14, wherein the re-input information is expressed by Printer Job Language.

16. The information processing method according to claim 14, wherein the re-input job is directly passable for printing, without executing further processing on the re-input job prior to printing.

* * * * *